US009769225B2

(12) United States Patent
Kalburgi et al.

(10) Patent No.: US 9,769,225 B2
(45) Date of Patent: Sep. 19, 2017

(54) METHOD AND APPARATUS FOR COORDINATING AN OPERATION OF MULTIPLE MOBILE DEVICES IN A GROUP CALL

(71) Applicant: MOTOROLA SOLUTIONS, INC, Schaumburg, IL (US)

(72) Inventors: Kiran Kalburgi, Bangalore (IN); Madhusudan Pai, Schaumburg, IL (US); Shrinivas Shetti, Bangalore (IN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 136 days.

(21) Appl. No.: 14/168,566

(22) Filed: Jan. 30, 2014

(65) Prior Publication Data

US 2015/0215356 A1    Jul. 30, 2015

(51) Int. Cl.
*H04L 29/06* (2006.01)
*H04W 4/08* (2009.01)
*H04L 12/58* (2006.01)
*H04W 84/08* (2009.01)
*H04M 7/00* (2006.01)
*H04W 76/00* (2009.01)

(52) U.S. Cl.
CPC .......... *H04L 65/4061* (2013.01); *H04L 51/04* (2013.01); *H04L 65/1063* (2013.01);
(Continued)

(58) Field of Classification Search
CPC ........... H04L 65/4061; H04L 65/1063; H04W 76/002; H04W 76/005
(Continued)

(56) References Cited

U.S. PATENT DOCUMENTS 7,002,933 B1 *   2/2006   Poon et al. .................. 370/315
2006/0035631 A1 *  2/2006   White et al. ................. 455/418
(Continued)

FOREIGN PATENT DOCUMENTS

EP    2328324 A1    6/2011
WO    0243408 A2    5/2002
(Continued)

OTHER PUBLICATIONS

The International Search Report and Written Opinion, PCT/US2015/012360, Filed Jan. 22, 2015, mailed :Jul. 23, 2015, all pages.

*Primary Examiner* — Jae Y Lee
*Assistant Examiner* — Jean F Voltaire

(57) ABSTRACT

A method, Group Application Server, and mobile device are provided that coordinate an operation of multiple mobile devices of a same user in a group call. When the multiple mobile devices join the group call, a first mobile device of the multiple mobile devices determines that it is an active device and provides an indication of such to the Group Application Server. In response to receiving the indication, the Group Application Server identifies a second mobile device, of the multiple mobile devices, that is a non-active device and one or more of modifies subsequent communications with the second mobile device or conveys a behavior modification message to the second mobile device. In another embodiment of the present invention, the first mobile device may indicate that it is the active device directly to the second mobile device and the second mobile device modify its behavior accordingly.

15 Claims, 8 Drawing Sheets

(52) U.S. Cl.
CPC ........... *H04W 4/08* (2013.01); *H04W 76/005* (2013.01); *H04W 84/08* (2013.01); *H04L 65/1006* (2013.01); *H04L 65/1016* (2013.01); *H04L 65/1069* (2013.01); *H04M 7/006* (2013.01); *H04W 76/002* (2013.01)

(58) Field of Classification Search
USPC .......................................................... 370/352
See application file for complete search history.

(56) References Cited

U.S. PATENT DOCUMENTS

| | | | |
|---|---|---|---|
| 2006/0221943 A1* | 10/2006 | Aborn ................... | H04L 12/581 370/356 |
| 2006/0246934 A1 | 11/2006 | Patel et al. | |
| 2006/0281407 A1* | 12/2006 | Deeds .......................... | 455/41.2 |
| 2007/0197248 A1* | 8/2007 | Reich ...................... | H04W 4/10 455/518 |
| 2009/0203319 A1 | 8/2009 | Sandoval et al. | |
| 2010/0097946 A1* | 4/2010 | Celentano et al. ........... | 370/252 |
| 2011/0263241 A1* | 10/2011 | Duarte .............. | H04M 1/72569 455/422.1 |
| 2013/0078966 A1 | 3/2013 | Chang | |
| 2014/0004900 A1 | 1/2014 | Lee | |

FOREIGN PATENT DOCUMENTS

| | | |
|---|---|---|
| WO | 2005104594 A1 | 11/2005 |
| WO | 2010065177 A1 | 6/2010 |
| WO | 2012152156 A1 | 11/2012 |

* cited by examiner

METHOD AND APPARATUS FOR COORDINATING AN OPERATION OF MULTIPLE MOBILE DEVICES IN A GROUP CALL

FIELD OF THE INVENTION

The present invention relates generally to Push-to-Talk (PTT) communication systems, and, in particular, to coordinating operation of multiple mobile devices in a PTT communication system.

BACKGROUND OF THE INVENTION

Voice over Internet Protocol (VoIP)-based Push-to-Talk (PTT) technologies allow a user to utilize multiple mobile devices when engaging in a PTT call. For example, a mobile device user may own multiple mobile devices, such as a smartphone, a wireless-enabled laptop computer, and a wireless-enabled tablet computer, that all operate on a same wireless network. Similarly, a Public Safety officer may have multiple mobile devices, such as a smartphone, a Land Mobile Radio (LMR), a wireless-enabled laptop computer, and a vehicle-mounted laptop computer, that may all be capable of engaging in a Push-to-Talk communication involving the officer.

The Session Initiation Protocol (SIP) supports SIP forking, wherein the multiple mobile devices of a user may each be rung when a VoIP or a PTT call is set up. Thus a call may be targeted to, and received by, all of the mobile devices of a user. However, with respect to PTT, call setup often is automatic on the multiple mobile devices of a user, with the result that all of the user's mobile devices may start rendering audio. This could be annoying to anyone in the vicinity of a user's mobile device if the user has left that mobile device behind when roaming to a different location with another one of the user's multiple mobile devices. Further, this could result in public exposure of a PTT call that is intended to be private. In addition, this is bandwidth inefficient as calls that are auto joined are setup to, and media is transmitted to, the multiple devices of a user.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
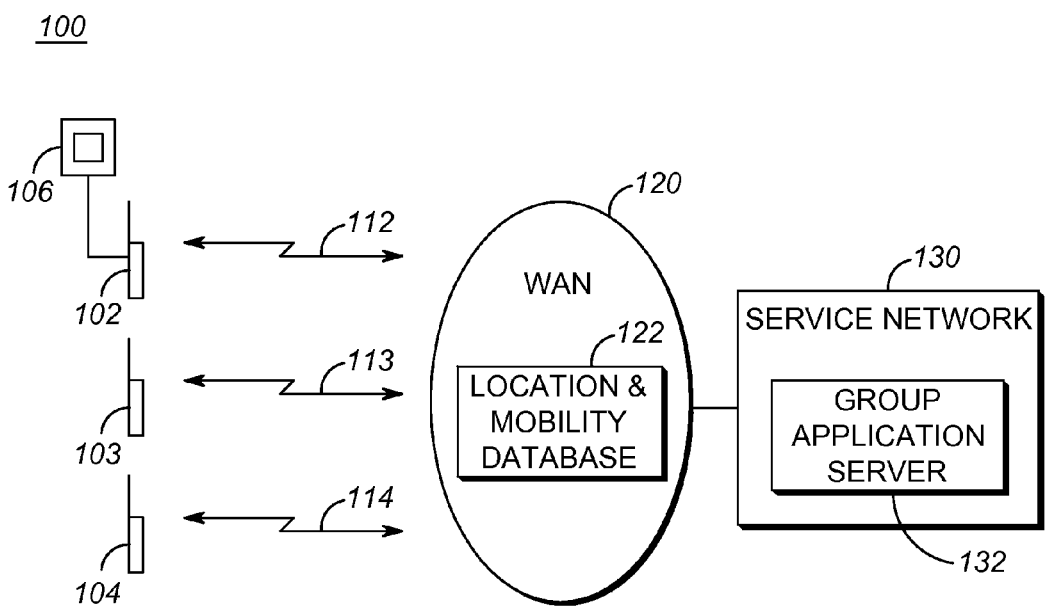
FIG. 1 is a block diagram of a wireless communication system in accordance with some embodiments of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION OF THE INVENTION

To address the need for a bandwidth efficient, unobtrusive scheme for performing a group call, a method, Group Application Server, and mobile device are provided that coordinate an operation of multiple mobile devices of a same user in a group call. When the multiple mobile devices join the group call, a first mobile device of the multiple mobile devices determines that it is an active device and provides an indication to the Group Application Server that the first mobile device is an active device. In response to receiving the indication, the Group Application Server identifies a second one or more mobile devices of the multiple mobile devices that are non-active devices and one or more of modifies subsequent communications with the second one or more mobile devices as part of the group call or conveys a behavior modification message to the second one or more mobile devices. In another embodiment of the present invention, the first mobile device may provide an indication that it is the active device directly to the second one or more mobile devices, and the second one or more mobile devices modify their behavior accordingly.

Generally, an embodiment of the present invention encompasses a method for coordinating an operation of multiple mobile devices of a same user in a group call. The method includes joining the multiple devices to the group call; receiving an indication that a first mobile device of the multiple mobile devices is an active device; in response to receiving the indication that the first mobile device is an active device, identifying a second one or more mobile devices of the multiple mobile devices that are non-active devices; and in response to identifying the second one or more mobile devices that are non-active devices, performing one or more of: modifying subsequent communications with the second one or more mobile devices as part of the group call and conveying a behavior modification message to the second one or more mobile devices.

Another embodiment of the present invention encompasses a method for coordinating an operation of multiple mobile devices of a same user in a group call. The method includes joining, by the multiple mobile devices, the group call; determining, by a first mobile device of the multiple mobile devices, that it is an active device; and in response to determining that the first mobile device is an active device, conveying, by the first mobile device, a behavior modification message associated with a second one or more mobile devices of the multiple mobile devices.

Yet another embodiment of the present invention encompasses an apparatus for coordinating an operation of multiple mobile devices of a same user in a group call. The apparatus includes a Group Application Server comprising a processor and an at least one memory device that is configured to store a set of instructions that, when executed by the processor, perform the following functions: join the plurality of mobile devices to the group call; receive an indication that a first mobile device of the plurality of mobile devices is an active device; in response to receiving the indication that the first mobile device is an active device, identify a second one or more mobile devices of the plurality of mobile devices that are non-active devices; and in response to identifying the second one or more mobile devices that are non-active devices, perform one or more of: modify subsequent communications with the second one or more mobile devices as part of the group call and convey a behavior modification message instruction to the second one or more mobile devices.

Still another embodiment of the present invention encompasses an apparatus for coordinating an operation of multiple mobile devices of a same user in a group call. The apparatus includes a first mobile device comprising a processor and an at least one memory device that is configured to store a set of instructions that, when executed by the processor, perform the following functions: join the first mobile device to the group call; determine that the first mobile device is an active device; and in response to determining that the first mobile device is an active device, convey a behavior modification message associated with a second one or more mobile devices, wherein the first mobile device and the second one or more mobile devices are included in the plurality of mobile devices of the same user.

The present invention may be more fully described with reference to FIGS. 1-9. FIG. 1 is a block diagram of a wireless communication system 100 in accordance with an embodiment of the present invention. Communication system 100 includes multiple mobile devices 102-104 (three shown), such as a broadband capable smart phone, a laptop computer, a land mobile radio (LMR), or a tablet, personal data assistant (PDA), or laptop computer with wireless capabilities. Each of the multiple mobile devices 102-104 is configured to operate on a broadband wide area network (WAN) 120 and to communicate with infrastructure devices in the corresponding network using any suitable over-the-air protocol and modulation scheme.

Communication system 100 further may include an audio accessory 106, such as a remote speaker microphone (RSM), that is coupled to one of the multiple mobile devices, such as mobile device 102, via a wired connection or a short-range wireless connection. For example, the mobile device may be mechanically coupled, for example, via a hooking mechanism, to a belt of a user and the audio accessory may be mechanically coupled, for example, via a hooking mechanism, to a shoulder strap of the user. The user then may listen to, and input audio communications into, the audio accessory and the audio accessory, in turn, transmits the user's audio communications to, and receives audio communications for the user from, WAN 120 via the corresponding mobile device.

The multiple mobile devices 102-104 communicate with infrastructure devices of WAN 120 via a corresponding wireless link 112-114. For example, a first mobile device 102 communicates with WAN 120 via a first wireless link 112, a second mobile device 103 communicates with WAN 120 via a second wireless link 113, and a third mobile device 104 communicates with WAN 120 via a third wireless link 114. WAN 120 is a broadband wireless network, for example, any third generation (3G) or fourth generation (4G) network, such as a Third Generation Partnership Project (3GPP) or 3GPP2 network, a 3GPP LTE (Long Term Evolution) network, an Institute of Electrical and Electronics Engineers (IEEE) 802.11 network (any variation), an IEEE 802.16 network (WiMAX or any other variation), and the like. WAN 120 may include one or more access networks (not shown) coupled to a core network that may include, among other core network elements in the event of an LTE system, a Mobility Management Entity (MME), multiple gateways, such as a Serving Gateway and a Public Data Network Gateway (PDN GW), a Policy Control and Charging Rules Function (PCRF), and a Home Subscriber Server (HSS).

WAN 120 further is coupled to a service network 130 that is hierarchically above the core network of the WAN. Service network 130 includes one or more Application Servers (ASs) or other services network elements implementing an Application Function (AF), such as a Group Application Server 132, for example, a Push-to-Talk (PTT) Server. Group Application Server 132 has a bearer connection and a signaling connection with WAN 120. For example, in a 3GPP LTE communication system, each AF may have a connection with the PDN GW of the WAN to convey user data and a connection with the PCRF of the WAN to convey control data.

WAN 120 includes a location and mobility database 122, such as the aforementioned HSS, a Home location Register (HLR), a Visited Location Register (VLR)), or an application level location service, that is accessible by Group Application Server 132. For example, Group Application Server 132 may query a Policy Control and Charging Rules Function (PCRF) of WAN 120 for the identity of an access node and cell serving a mobile device. In response to receiving the query, the PCRF may retrieve, from an HSS, an identifier of a cell, such as a Physical Cell Identifier (PCI), a Target Cell Identifier (TCI), and a E-UTRAN Cell Global Identifier (ECGI), which serves the mobile device and provides the retrieved cell identifier to the Group Application Server.

Figure 2:
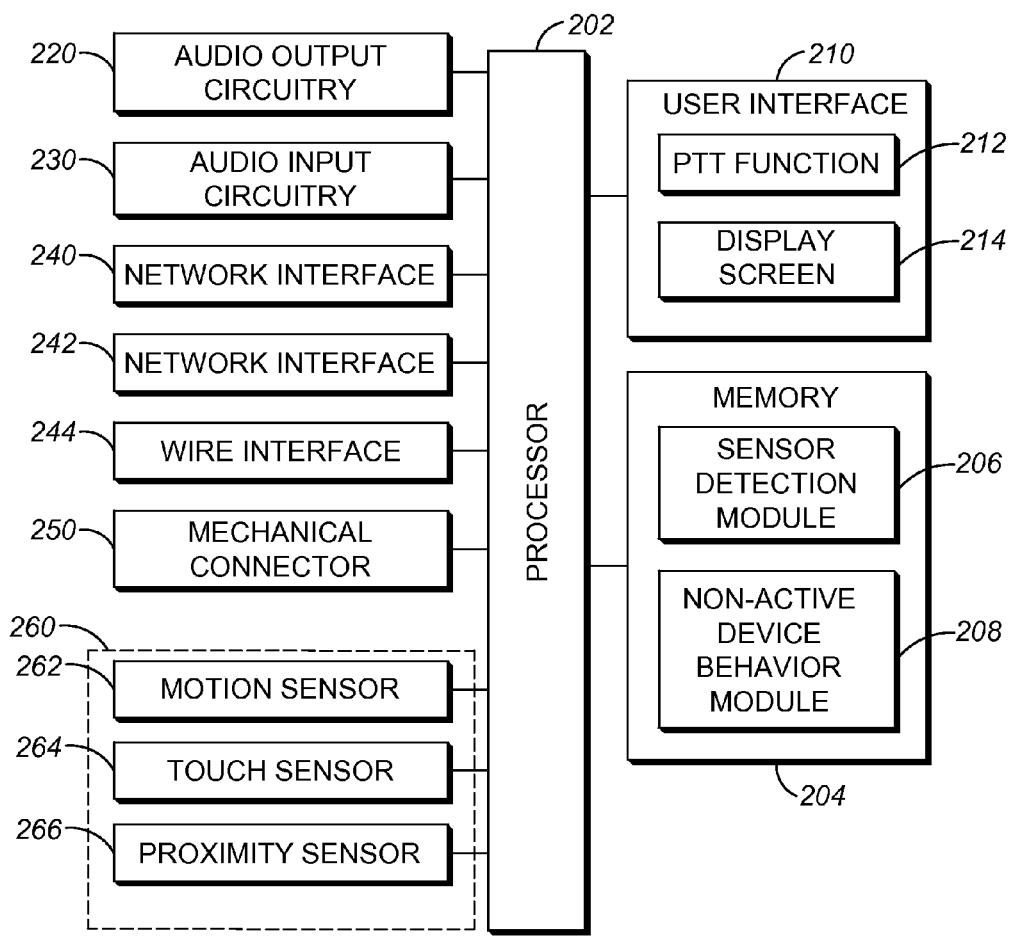
FIG. 2 is a block diagram of a mobile device in accordance with some embodiments of the present invention.

Referring now to FIG. 2, a block diagram 200 is provided of a mobile device in accordance with some embodiments of the present invention. The mobile device operates under the control of a processor 202, such as one or more microprocessors, microcontrollers, digital signal processors (DSPs), combinations thereof or such other devices known to those having ordinary skill in the art. Processor 202 operates the mobile device according to data and instructions stored in an at least one memory device 204, such as random access memory (RAM), dynamic random access memory (DRAM), and/or read only memory (ROM) or equivalents thereof, that stores data and programs that may be executed by processor 202 so that the mobile device may perform the functions described herein. At least one memory device 204 of the mobile device may include a sensor detection module 206, that is, software that, when executed by processor 202, allows the mobile device to detect a motion of the mobile device, a touching of the mobile device by a user (including touching of the PTT button without pressing it), or a proximity of the mobile device (for example, to a user) based on signaling generated by sensor devices 260, and to determine a corresponding activity of the user of the mobile device based on the signaling received from the sensor devices. At least one memory device 204 of the mobile device further may include a non-active device behavior modification module 208 comprising instructions for one or more behavioral modifications to be undertaken by the mobile device in response to being informed that it is a non-active device, such as a muting of a speaker of audio output circuitry 220, a lowering of a brightness of its display screen 214, or a providing of one or more of an audio (for example, beep), a visual (for example, a status bar notification or a blinking LED on a panel), or a haptic (for example, a vibration) notification about non-active device status.

The mobile device further includes a user interface 210 that provides a user of the mobile device with a capability of interacting with the mobile device, including inputting instructions into the mobile device, audio output circuitry 220 for audio output for listening by a user of the mobile device, and audio input circuitry 230 for allowing a user to input audio signals into the mobile device. User interface 210 may include a Push-to-Talk (PTT) function 212, such as a PTT key or a voice-enabled PTT trigger (in the latter instance, a link between audio input circuitry 230 and a PTT function provided by processor 202) for initiating, and reserving a floor of, a PTT call. User interface 210 further may include a display screen 214 and a keypad that includes multiple keys that may be used by a user of the mobile device to input instructions into the mobile device, for example, the PTT key, and that may be used by a user to input an instruction into, or to receive a data or textual output from, the mobile device. Display screen 214 may comprise a touch screen that is able to detect a user's touch and further a position (i.e., an X-coordinate and a Y-coordinate) of the touch on the touch screen and convey the position data to processor 202. Based on the position data, processor 202 then translates the user's touch into an instruction. When display screen 214 comprises a touch screen, the touch screen may display the keypad and a soft PTT button.

The mobile device further includes a first network interface 240 coupled to processor 202 and that comprises an RF transceiver. RF transceiver 240 comprises an RF receiver (not shown) for receiving RF signals from a WAN network device and an RF transmitter (not shown) for transmitting RF signals to a WAN network. The mobile device also includes a second network interface 242 coupled to processor 202 and that comprises a short-range wireless transceiver for short-range wireless communications. Second network interface 242 allows the mobile device to directly communicate with other mobile devices via a short-range wireless link, such as a Wi-Fi, Bluetooth®, a near field communication (NFC) link, or the like. The audio accessory further includes a wire interface 244 which, along with second network interface 242, allows the mobile device to directly communicate with an audio accessory, for example, via a wired link, a Bluetooth® link, or a near field communication (NFC) link.

Additionally, the mobile device may include a mechanical connector 250 for coupling the mobile device to a user of the mobile device, for example, a belt clip locking mechanism for locking the mobile device onto a belt of the user or into a mobile device carrying case that is coupled to a belt of the user. Mechanical connector 250 may include a switch that is flipped when the mobile device is locked onto a belt of the user or is locked into a carry case, and which is flipped the other way when the mobile device is no longer mechanically coupled to the user, or respectively the carry case, thereby indicating to the mobile device whether the mobile device is being worn in a body-worn position or is being held by the user.

The mobile device further may include one or more sensor devices 260, such as a motion sensor 262, for example, an accelerometer, that senses a motion of the mobile station, for example, when a mobile station is lifted or when a position of the mobile station changes, a touch sensor 264, for example, a touch-sensitive housing of the mobile device that detects a user's touch on the mobile device, and a proximity sensor 266, such as a near field communication sensor or an infrared sensor that detects when another mobile device is nearby and/or detects a proximity of a user to the mobile device. However, other features of the mobile device may function as sensor devices 260 for the purpose of the present invention. For example, touch screen 212 and PTT key 214 (a soft key or a hard key) of user interface 210 may function as touch sensors and mechanical connector 250 may function as a proximity sensor, for example, detecting a proximity of the user to the mobile device, or as a motion sensor, for example, detecting whether the user has picked up the mobile device to use it. Each sensor device 260, in response to detecting an activity of the user appropriate for that sensor device, generates an electrical signal that is conveyed to processor 202 in accordance with techniques known in the art. In response to receiving an electrical signal from a sensor device 260, processor 202 is able to determine a corresponding action that has been taken by the user of the mobile device.

Figure 3:
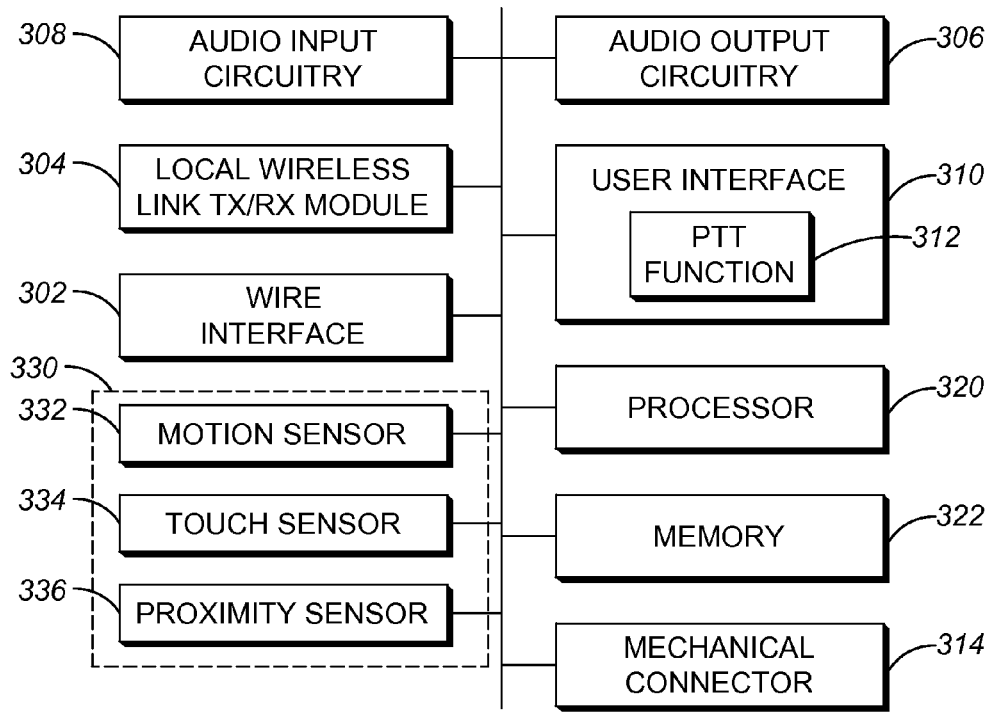
FIG. 3 is a block diagram of an audio accessory in accordance with some embodiments of the present invention.

Referring now to FIG. 3, a block diagram 300 is provided of an audio accessory, such as a remote speaker microphone (RSM), in accordance with some embodiments of the present invention. The audio accessory includes one or more of a wire interface 302 and a local wireless link transmit/receive module 304 that allow the audio accessory to directly communicate with a mobile device, for example, via a wired link, a Bluetooth® link, a near field communication (NFC) link, a wireless local area network (WLAN) link, or the like. The audio accessory further includes a mechanical connector 314 for coupling the audio accessory to a user of the audio accessory, for example, for hooking the audio accessory onto a shoulder strap of the user.

The audio accessory further includes audio output circuitry 306 for audio output for listening by a user of the audio accessory and audio input circuitry 308 for allowing a user to input audio signals into the audio accessory. The audio accessory also includes a user interface 310 that provides a user of the audio accessory with the capability of interacting with the audio accessory and a coupled mobile device. For example, user interface 310 may include a PTT function 312, such as a PTT key or a voice-enabled PTT trigger (in the latter instance, a link between audio input circuitry 308 and PTT function 312 may be provided by a processor 320) for initiating, and reserving a floor of, a PTT call, or any other button coupled to a switch that allows the user to enable one or more of audio input circuitry 308 and audio output circuitry 306. In another embodiment of the present invention, user interface 310 further may comprise software that provides a user of the audio accessory with a more complex capability of interacting with the audio accessory, including inputting instructions into the audio accessory.

The audio accessory further may include a processor 320, such as one or more microprocessors, microcontrollers, digital signal processors (DSPs), combinations thereof or such other devices known to those having ordinary skill in the art. Processor 320 may control the operation of audio accessory 106, including an exchange of audio communications with a mobile station. Processor 330 then operates the audio accessory according to data and instructions stored in an at least one memory device 322, such as random access memory (RAM), dynamic random access memory (DRAM), and/or read only memory (ROM) or equivalents thereof, that stores data and programs that may be executed by processor 320 so that the audio accessory may perform the functions described herein.

The audio accessory further may include one or more sensor devices 330, such as a motion sensor 332, for example, an accelerometer, that senses a motion of the audio accessory, for example, when the audio accessory is lifted or when a position of the audio accessory changes, a touch sensor 334, for example, a touch-sensitive housing of the audio accessory that detects a user's touch on the audio accessory, and a proximity sensor 336, such as a near field communication sensor or an infrared sensor that detects when a mobile device is nearby and/or detects a proximity of a user to the audio accessory. However, other features of the audio accessory may function as sensor devices 330 for the purpose of the present invention. For example, a PTT key 312 (a soft key or a hard key) of user interface 310 may function as a touch sensor and mechanical connector 314 may function as a proximity sensor, for example, detecting a proximity of the user to the audio accessory, or as a motion sensor, for example, detecting whether the user has picked up the audio accessory to use it. Each sensor device 330, in response to detecting an activity of the user appropriate for that sensor device, generates an electrical signal that is conveyed to processor 320 in accordance with techniques known in the art. In response to receiving an electrical signal from a sensor device 330, processor 320 is able to determine a corresponding action that has been taken by the user of the audio accessory. Further, the presence of an audio signal above a pre-defined intensity threshold level, input to audio input circuitry 230, 308 of a mobile device or an audio accessory, may be interpreted by their respective processors 202, 320 as a PPT-enabling event that indicates a user selection of the device (for example, the coupled mobile device in the instance of the audio accessory) as the user's 'active device,' as described in greater detail below, in the same way that the physical actuation of a PTT button would do.

Figure 4:
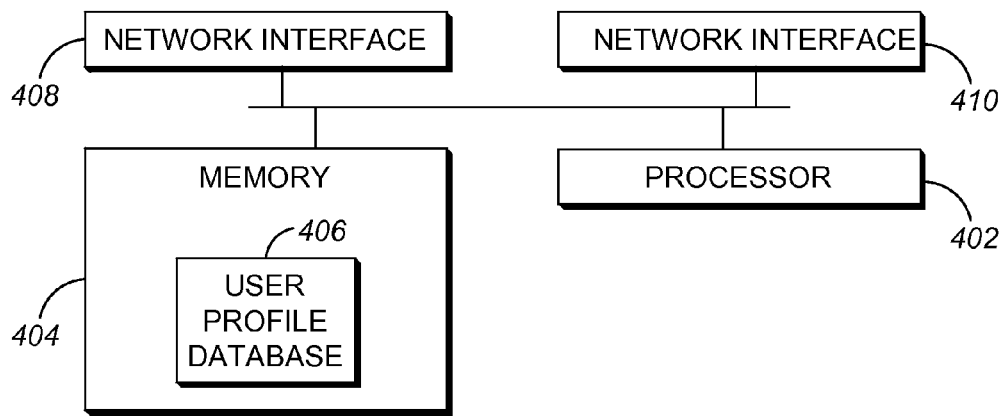
FIG. 4 is a block diagram of a Push-to-Talk (PTT) server in accordance with some embodiments of the present invention.

Referring now to FIG. 4, a block diagram 400 is provided of a Group Application Server in accordance with an embodiment of the present invention. The Group Application Server operates under the control of a processor 402, such as one or more microprocessors, microcontrollers, digital signal processors (DSPs), combinations thereof or such other devices known to those having ordinary skill in the art. Processor 402 operates the Group Application Server according to data and instructions stored in a respective at least one memory device 404 such as random access memory (RAM), dynamic random access memory (DRAM), and/or read only memory (ROM) or equivalents thereof, that stores data and programs that may be executed by the corresponding processor so that the mobile device or AP may perform the functions described herein. The Group Application Server further includes multiple network interfaces 408, 410 (two shown) in communication with processor 402, for example, a first network interface 408 for directly communicating with other infrastructure devices of a network that includes the Group Application Server, and a second network interface 410, such as an Inter-RF Subsystem Interface (ISSI) or Open Mobile Alliance (OMA) Push-to-Talk Network to Network Interface (NNI), for communicating with other networks.

The at least one memory device 404 of the Group Application Server further includes a user profile database 406 that maintains a profile in association with each user that is a member of the communication groups served by the Group Application Server. In various embodiments of the present invention, the parameters stored in a profile may be pre-provisioned in the Group Application Server, may be provided to the Group Application Server by a mobile device when the mobile device activates in communication system 100, and/or may be retrieved by the Group Application Server from another element of communication system 100. The parameters maintained in a user's profile may include a location of the user, such as an access node or a cell serving a mobile device associated with the user, an identifier of each communication group of which the user is a member, and a listing of each mobile device associated with the user. For example, as mobile devices 102-104 all are associated with a same user, each of mobile devices 102-104 would be identified in the user's profile, for example, by an identifier of the such mobile device, such as a subscriber unit identifier (SUID), an International Mobile Subscriber Identifier (IMSI), or a Wi-Fi MAC address, that may be used to uniquely identify the mobile device in a network in which it is operating.

Unless otherwise specified herein, the functionality described herein as being performed by a mobile device, audio accessory, and Group Application Server is implemented with or in software programs and instructions stored in the respective at least one memory device 204, 304, 404 of the mobile device, audio accessory, and Group Application Server and executed by the associated processor 202, 302, 402 of the mobile device, audio accessory, and Group Application Server.

Figure 5:
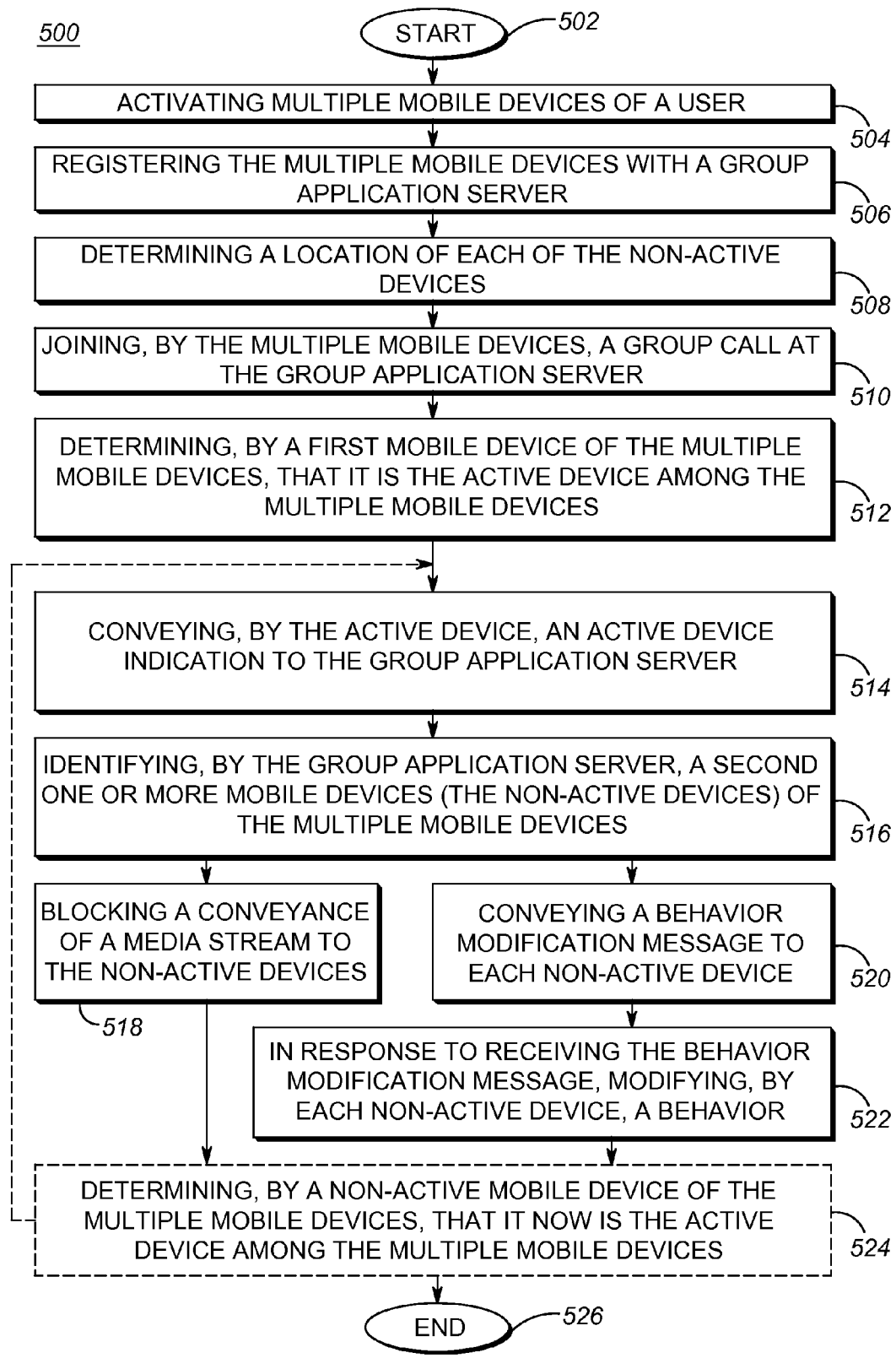
FIG. 5 is a logic flow diagram illustrating a method by which the communication system of FIG. 1 coordinates an operation of multiple mobile devices in accordance with some embodiments of the present invention.

Referring now to FIG. 5, a logic flow diagram 500 is provided that illustrates a method performed by communication system 100 in coordinating an operation of the multiple mobile devices 102-104 in accordance with an embodiment of the present invention. Logic flow diagram 500 begins (502) when multiple mobile devices 102-104 under the control of a same user activate (504) in communication system 100. For example, the multiple mobile devices may power up in communication system 100 or the mobile devices may roam into communication system 100. As part of the process of activating, each mobile device 102-104 registers (506) with Group Application Server 132. In response to registration of each of the multiple mobile devices 102-104, Group Application Server 132 determines (508) a location of each of the multiple mobile devices 102-104 by reference to location and mobility database 122 and stores the determined locations in user profile database 406 of the Group Application Server.

Subsequent to the registration of the multiple mobile devices 102-104, a group call is initiated that includes the user, and correspondingly mobile devices 102-104. In response to the initiation of the group call, each of mobile devices 102-104 joins (510) the group call at Group Application Server 132.

At some point either prior to or after the initiation of the group call, a first mobile device of the user, such as mobile device 102 (and/or audio accessory 106 with respect to mobile device 102) determines (512), based on signals generated by one or more sensor devices of the mobile device and/or one or more sensor devices of the audio accessory, that it is the 'active device' among the multiple mobile devices 102-104 associated with that user. 'Active device,' as used herein, refers to a mobile device that has been selected by the user, at that moment in time, intentionally or unintentionally, as a preferred device among the multiple mobile devices of the user for input of communications intended for conveyance to Group Application Server 132 and/or for reception of communications from the Group Application Server as part of the group call.

For example, mobile device 102 may detect, via a motion sensor 262 of the mobile device, a motion of the mobile device that indicates that the mobile device has been selected by the user to input communications intended for conveyance to Group Application Server 132 and to receive communications from the Group Application Server, for example, when the mobile device is lifted up or when a position of the mobile device otherwise changes in a way that might indicate that the user has selected the mobile device for inputting or receiving communications. By way of another example, mobile device 102 may detect, via a touch sensor 264 of the mobile device, that the user is holding the mobile device in his/her hand, indicating that the user has selected the mobile device for inputting or receiving communications. By way of yet another example, mobile device 102 may detect, via a proximity sensor 266 of the mobile device, that the mobile device is proximate to the body of the user, or to a face of the user, indicating that the user has selected the mobile device for inputting or receiving communications. In still other examples, mobile device 102 may determine that it is the 'active device' because the user has touched or depressed a PTT key of the user interface 210, 310 of the mobile device or the audio accessory connected to the mobile device, because the mobile device has received audio input from the user via audio input circuitry 230, 308 of the mobile device or the audio accessory, or because the user has removed the mobile device or the audio accessory from a belt, carry case, or shoulder strap of the user, as detected by mechanical connector 250 or 314.

In response to determining, by mobile device 102, that it is the active device, the mobile device conveys (514) an active device indication to Group Application Server 132, indicating that it is the active device among the multiple mobile devices 102-104 of the user. In one embodiment of the present invention, the active device indication may be a control message. For example, the active device indication may be a new or existing Media Burst Control Protocol (MBCP) message, for example, a RTP (Real-time Transport Protocol) message or a Real Time Transport Control Protocol (RTCP) message, that is modified to include an indicator that the mobile device sourcing the active device indication is an active device of the user associated with the mobile device. In response to receiving the active device indication, Group Application Server 132 identifies (516), by reference to the user's profile in user profile database 406, a second one or more mobile devices (that is, 'non-active devices') of the multiple mobile devices 102-104 associated with the user, that is, mobile devices 103 and 104.

In one embodiment of the present invention, in response to receiving the active device indication and to identifying the non-active devices associated with the user, Group Application Server 132 blocks (518) a conveyance, by the Group Application Server, of media steams of the group call to the non-active devices 103, 104. Logic flow diagram 500 then may end (526).

In another embodiment of the present invention, in response to receiving the active device indication and to identifying the non-active devices associated with the user, Group Application Server 132 conveys (520) a behavior modification message to each non-active device 103, 104 that instructs the non-active device to modify a behavior in way appropriate for a non-active device. For example, the behavior modification message may be a new or existing Media Burst Control Protocol (MBCP) message, for example, a RTP (Real-time Transport Protocol) message or Real Time Transport Control Protocol (RTCP) message, that is modified to include a behavior modification instruction. In one embodiment of the present invention, the behavior modification instruction may comprise metadata instructing the non-active device 103, 104 to undertake a particular behavior, for example, to mute a speaker of its audio output circuitry 220, to lower a brightness of its display screen 214, or to provide one or more of an audio (for example, a beep), a visual (for example, a status bar notification or a blinking LED on panel) or a haptic (for example, a vibration) notification about non-active device status. In response to receiving the behavior modification message, each non-active device 103, 104 modifies (522) its behavior as instructed by the message. However, in another embodiment of the present invention, the behavior modification message may comprise an instruction to modify the mobile device's behavior in way appropriate for a non-active device without listing behaviors to be modified. In the later instance, the non-active device then may modify its behavior in accordance with instructions maintained in the non-active device behavior modification module 208 of the at least one memory device 204 of the non-active device. Logic flow diagram 500 then ends (526).

In yet another embodiment of the present invention, at some point in time during the group call, a non-active mobile device of the user's multiple mobile devices 102-104, such as mobile device 103, may determine (524), based on signals generated by one of more of the sensor devices 260 of the non-active mobile device, that it is now the 'active device' among the multiple mobile devices 102-104 associated with that user. Logic flow diagram 500 then returns to step 512.

Figure 6:
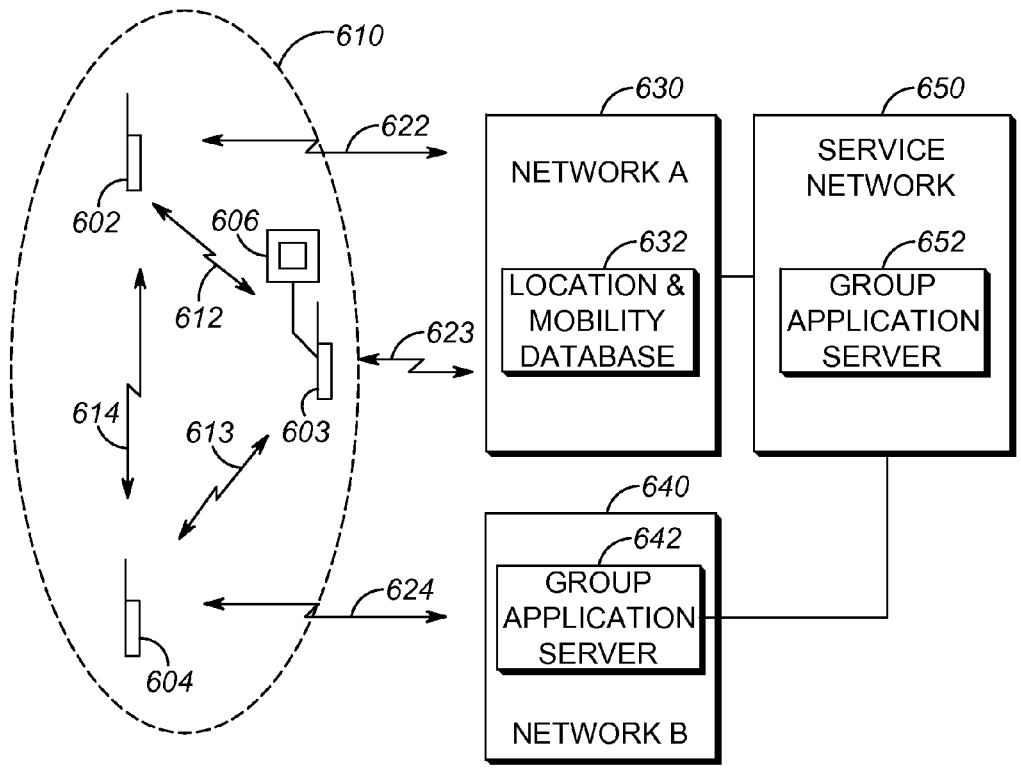
FIG. 6 is a block diagram of a wireless communication system in accordance with other embodiments of the present invention.

Referring now to FIG. 6, a block diagram is provided of a communication system 600 in accordance with another embodiment of the present invention, wherein the communication system includes both broadband devices connected to a broadband network and narrowband devices connected to a narrowband network and wherein each of the mobile devices of a same user are within sufficient proximity of each other so as to be able to engage in a peer-to-peer wireless communications with each other over a Personal Area Network (PAN) 610. That is, as depicted in FIG. 6, communication system 600 includes multiple mobile devices 602-604 (three shown), such as a broadband or narrowband smart phone, a laptop computer, a land mobile radio (LMR), or a tablet, personal data assistant (PDA), or laptop computer with wireless capabilities. Further, communication system 600 may include an audio accessory 606, such as a remote speaker microphone (RSM), that is coupled to one of the multiple mobile devices, such as mobile device 603, via a wired connection or a short-range wireless connection.

One or more of the multiple mobile devices 602-604, such as mobile devices 602 and 603, is configured to operate on a first, broadband wide area network (WAN) 630 ('Network A'), similar to WAN 120, and to communicate with infrastructure devices in WAN 630 using any suitable wideband over-the-air protocol and modulation scheme. One or more others of the multiple mobile devices 602-604, such as mobile device 604, is configured to operate on a second, public safety narrowband (PSNB) wide area network (WAN) 640 ('Network B'), such as a P25 communication system or an ASTRO® communication system available from Motorola Solutions, Inc., of Schaumburg, Ill., and to communicate with infrastructure devices in WAN 640, such as an access network (not shown) and core network (not shown) of WAN 640, using any suitable narrowband over-the-air protocol and modulation scheme. It is assumed with respect to FIG. 6 that WANs 630 and 640 provide overlapping coverage, such as mobile devices 602-604 may be close enough to each other to communicate over PAN 610 while being serviced by different WANs.

The multiple mobile devices 602-604 communicate with infrastructure devices of their corresponding network via a corresponding wireless link 622-624. For example, a first mobile device 602 communicates with WAN 630 via a first wireless link 622, a second mobile device 603 communicates with WAN 630 via a second wireless link 623, and a third mobile device 604 communicates with WAN 640 via a third wireless link 624. Further, the multiple mobile devices 602-604 are sufficiently close to each other so as to pair up with each other via PAN 610, that is, via their short-range network interfaces 242 and short-range wireless links 612-614, such as a Wi-Fi, Bluetooth® or a near field communication (NFC) link. That is, mobile devices 602 and 603 may communicate over wireless link 612, mobile devices 603 and 604 may communicate over wireless link 613, and mobile devices 602 and 604 may communicate over wireless link 614. For example and as known in the art, a user may physically pair the devices, for example, via a Personal Identification Number (PIN) entry or an NFC pairing.

Each of WANs 630 and 640 further is coupled to a service network 650 that is hierarchically above the core networks of the WANs. Service network 650 includes one or more Application Servers (ASs) or other services network elements implementing an Application Function (AF), such as a Group Application Server 652, for example, a Push-to-Talk (PTT) Server. Group Application Server 652 has a bearer connection and a signaling connection with WAN 630. For example, in a 3GPP LTE communication system, each AF may have a connection with the PDN GW of the WAN to convey user data and a connection with the PCRF of the WAN to convey control data. Further, WAN 640 also includes Group Application Server 642 that communicates with Group Application Server 652, and optionally may include a gateway (not shown), such as an Inter-system Gateway (ISGW), that that implements an interworking function and provides interoperability between the Group Application Servers 642, 652, for example, that interfaces with an Inter-RF Subsystem Interface (ISSI) of Group Application Server 652.

The multiple mobile devices 602-604 belong to a same user and, correspondingly, belong to a same communication group as the user, which communication group is homed at Group Application Server 652. Correspondingly, Group Application Server 652 maintains, in its user profile database 406 of its at least one memory device 404, an identifier of each communication group of which the user is a member and a listing of each mobile device 602-604 associated with the user.

WAN 630 further includes a location and mobility database 632, such as a Home Subscriber Server (HSS), a Home location Register (HLR), a Visited Location Register (VLR), or an application level location service, that is accessible by a Group Application Server 652. For example, Group Application Server 652 may query an HSS of WAN 630, via a first network interface 408 of the server and a PCRF of WAN 630, for the identity of an access node and cell serving a mobile device. In response to receiving the query, the PCRF may retrieve, from an HSS, an identifier of a cell, such as a Physical Cell Identifier (PCI), a Target Cell Identifier (TCI), and a E-UTRAN Cell Global Identifier (ECGI), which serves the mobile device and provides the retrieved cell identifier to the Group Application Server.

Figure 7:
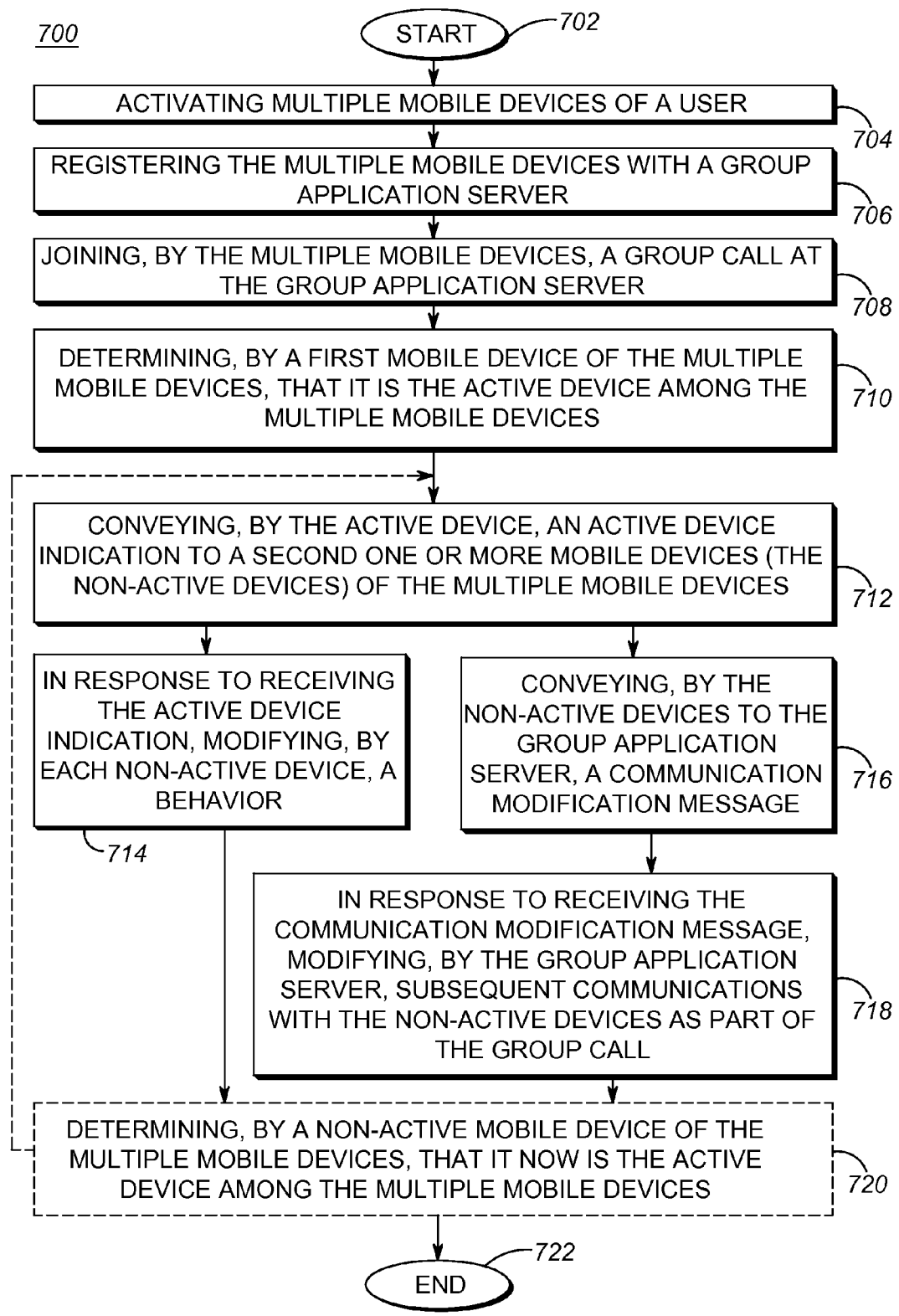
FIG. 7 is a logic flow diagram illustrating a method by which the communication system of FIG. 6 coordinates an operation of multiple mobile devices in accordance with some embodiments of the present invention.

Referring now to FIG. 7, a logic flow diagram 700 is provided that illustrates a method performed by communication system 600 in coordinating an operation of the multiple mobile devices 602-604 in accordance with an embodiment of the present invention. Logic flow diagram 700 begins (702) when multiple mobile devices 602-604 under the control of a same user activate (704) in communication system 600. For example, the multiple mobile devices may power up in communication system 600 or the multiple mobile devices may roam into a coverage area of a WAN 630, 640 of communication system 600. As part of the process of activating, each mobile device 602-604 registers (706) with its serving Group Application Server 642, 652. For example, an LMR device 604 would register with Group Application Server 642, that is, its home P25 server, which would then "affiliate" to the group homed in Group Application Server 652 over the ISSI interface. In another embodiment, the LMR device 604 may roam over to the Group Application Server 652, which would then unit register over the ISSI interface with the home P25 network 640 of the user. In this case, the group affiliation from LMR device 604 is received directly at Group Application Server 652.

Subsequent to the registration of the multiple mobile devices 602-604, a group call is initiated that includes the user and correspondingly mobile devices 602-604. In response to the initiation of the group call, each of mobile devices 602-604 joins (708) the call at Group Application Server 652. At some point either prior to or after the initiation of the group call, a first mobile device of the user, such as mobile device 603 (and/or audio accessory 606 with respect to mobile device 603) determines (710), based on signals generated by one of more sensor devices of the mobile device and/or one of more sensor devices of the audio accessory, that it is the 'active device' among the multiple mobile devices 602-604 associated with that user.

For example, mobile device 603 may detect, via a motion sensor 262 of the mobile device, a motion of the mobile device that indicates that the mobile device has been selected by the user to input communications intended for conveyance to Group Application Server 652 and to receive communications from the Group Application Server, for example, when the mobile device is lifted up or when a position of the mobile device otherwise changes in a way that might indicate that the user has selected the mobile device for inputting or receiving communications. By way of another example, mobile device 603 may detect, via a touch sensor 264 of the mobile device, that the user is holding the mobile device in his/her hand, indicating that the user has selected the mobile device for inputting or receiving communications. By way of yet another example, mobile device 603 may detect, via a proximity sensor 266 of the mobile device, that the mobile device is proximate to the body of the user, or to a face of the user, indicating that the user has selected the mobile device for inputting or receiving communications. In still other examples, mobile device 603 may determine that it is the 'active device' because the user has touched or depressed a PTT key of the user interface 210, 310 of the mobile device or the audio accessory connected to the mobile device, because the mobile device has received audio input from the user via audio input circuitry 230, 308 of the mobile device or the audio accessory, or because the user has removed the mobile device or the audio accessory from a belt, carry case, or shoulder strap of the user, as detected by mechanical connector 250 or 314.

In response to determining, by mobile device 603, that it is the active device, the mobile device conveys (712), via short range links 612 and 613, an active device indication to a second one or more mobile devices of the multiple mobile devices 602-604 of the user, that is, mobile device 602 and 604, indicating that mobile device 603 is the active device among the multiple mobile devices 602-604 of the user. In various embodiments of the present invention, in response to receiving the active device indication, each of the non-active devices 602 and 604 may self-modify its behavior or may request that Group Application Server 652 modify its communications with the non-active device.

That is, in one such embodiment of the present invention, in response to receiving the active device indication, each of the non-active devices 602 and 604 modifies (714) its behavior in accordance with instructions maintained in the non-active device behavior modification module 208 of the at least one memory device 204 of the non-active device. Logic flow diagram 700 then may end (722).

In another such embodiment of the present invention, in response to receiving the active device indication, each of the non-active devices of the user, that is, mobile devices 602 and 604, conveys (716) a communication modification message to Group Application Server 652 requesting a modification of the Group Application Server's communications with the non-active device relating to the group call in which the non-active device is engaged. For example, the communication modification message may be a new or existing Media Burst Control Protocol (MBCP) message, for example, an RTP message or an RTCP message, that is modified to include a communication modification instruction.

In response to receiving the communication modification message from a non-active device, Group Application Server 652 may modify (718) subsequent communications with the non-active device that are part of the group call, for example, blocking a conveyance, by the Group Application Server, of media steams of the group call to the non-active device. Logic flow diagram 700 then may end (722).

In another embodiment of the present invention, at some point in time during the group call, a non-active mobile device of the user's multiple mobile devices 602-604, such as mobile device 602, may determine (720), based on signals generated by one of more of the sensor devices 260, that it is now the 'active device' among the multiple mobile devices 602-604 associated with that user. Logic flow diagram 700 then returns to step 712.

Figure 8:
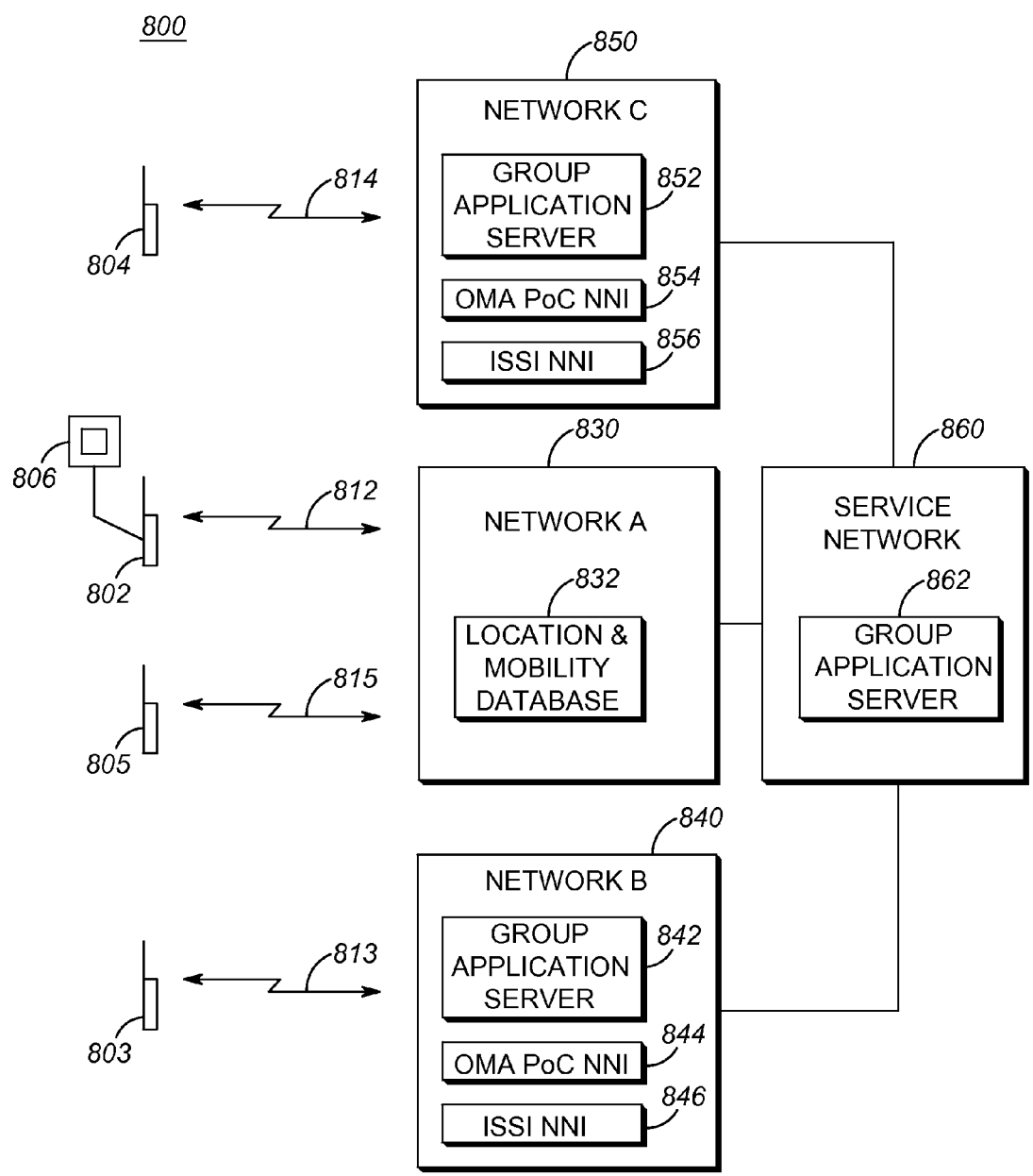
FIG. 8 is a block diagram of a wireless communication system in accordance with other embodiments of the present invention.

Referring now to FIG. 8, a block diagram is provided of a communication system 800 in accordance with yet another embodiment of the present invention, wherein the communication system includes both broadband devices connected to a broadband network and narrowband devices connected to a narrowband network and wherein the mobile devices of a same user are sufficiently far apart from each other so as to be unable to engage in a peer-to-peer wireless communications with each other over a PAN. That is, as depicted in FIG. 8, communication system 800 includes multiple mobile devices 802-805 (four shown), such as a broadband or narrowband smart phone, a laptop computer, a land mobile radio (LMR), or a tablet, personal data assistant (PDA), or laptop computer with wireless capabilities. Further, communication system 800 may include an audio accessory 806, such as a remote speaker microphone (RSM), that is coupled to one of the multiple mobile devices, such as mobile device 802, via a wired connection or a short-range wireless connection.

One or more of the multiple mobile devices 802-805, such as mobile devices 802 and 805, is configured to operate on a first, broadband wide area network (WAN) 830 ('Network A') and to communicate with infrastructure devices in WAN 830 using any suitable wideband over-the-air protocol and modulation scheme. One or more others of the multiple mobile devices 802-805, such as mobile device 803, is configured to operate on a second, public safety narrowband (PSNB) wide area network (WAN) 840 ('Network B'), such as a P25 communication system or an ASTRO® communication system available from Motorola Solutions, Inc., of Schaumburg, Ill., and to communicate with infrastructure devices in WAN 840, such as an access network (not shown) and core network (not shown) of WAN 840, using any suitable narrowband over-the-air protocol and modulation scheme. And one or more others of the multiple mobile devices 802-805, such as mobile device 804, is configured to operate on a third, broadband or narrowband wide area network (WAN) 850 ('Network C') and to communicate with infrastructure devices in WAN 850, such as an access network (not shown) and core network (not shown) of WAN 850, using any suitable narrowband or broadband over-the-air protocol and modulation scheme.

WAN 830 further is coupled to a service network 860 that is hierarchically above the core networks of the WANs. Service network 860 includes one or more Application Servers (ASs) or other services network elements implementing an Application Function (AF), such as a Group Application Server 862, for example, a Push-to-Talk (PTT) Server. Group Application Server 862 has a bearer connection and a signaling connection with WAN 830. For example, in a 3GPP LTE communication system, each AF may have a connection with the PDN GW of the WAN to convey user data and a connection with the PCRF of the WAN to convey control data. WAN 830 further includes a location and mobility database 832, such as a Home Subscriber Server (HSS), a Home location Register (HLR), a Visited Location Register (VLR)), or an application level location service, that is accessible by Group Application Server 862. For example, Group Application Server 862 may query an HSS of WAN 830, via a first network interface 408 of the server and a PCRF of WAN 830, for the identity of an access node and cell serving a mobile device. In response to receiving the query, the PCRF may retrieve, from an HSS, an identifier of a cell, such as a Physical Cell Identifier (PCI), a Target Cell Identifier (TCI), and a E-UTRAN Cell Global Identifier (ECGI), which serves the mobile device and provides the retrieved cell identifier to the Group Application Server.

Each of WANs 840 and 850 includes, or is operably coupled to, a respective Group Application Server 842, 852, such as an Open Mobile Alliance Push-to-Talk over Cellular (OMA PoC) server. Further each of WANs 840 and 850 includes one or more gateways, such as an OMA PoC Network-to-Network Interface (NNI) 844, 854 and/or an Inter-RF Subsystem Interface (ISSI) NNI 846, 856. Each of gateways 844, 846, 854, and 856 implements an interworking function that provides interoperability among the WANs and further between each of Group Application Servers 842 and 852 and an OMA PoC NNI or ISSI NNI of Group Application Server 862.

The multiple mobile devices 802-805 communicate with infrastructure devices of their corresponding serving networks 830, 840, 850 via a corresponding wireless link 812-815. For example, a first mobile device 802 and a fourth mobile device 805 communicate with WAN 830 via a first wireless link 812 and a fourth wireless link 815, respectively, a second mobile device 803 communicates with WAN 840 via a second wireless link 813, and a third mobile device 804 communicates with WAN 850 via a third wireless link 814.

A plurality of the multiple mobile devices, that is, mobile devices 802-804, belong to a same user and, correspondingly, belong to a same communication group as the user, which communication group is homed at a Group Application Server 862. Correspondingly, Group Application Server 862 maintains, in its user profile database 406 of its at least one memory device 404, an identifier of each communication group of which the user is a member and a listing of each mobile device 802-804 associated with the user.

Figure 9:
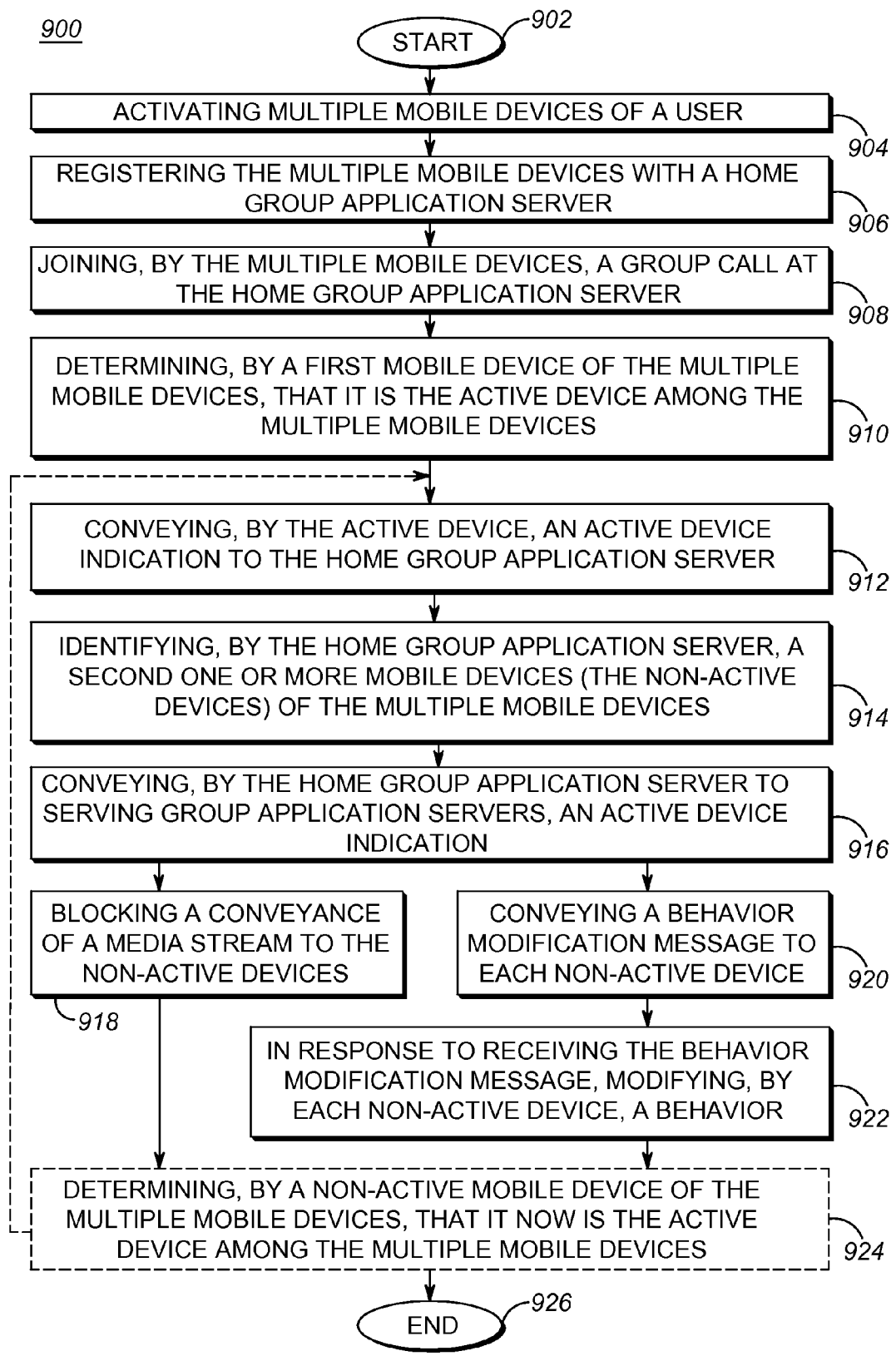
FIG. 9 is a logic flow diagram illustrating a method by which the communication system of FIG. 8 coordinates an operation of multiple mobile devices in accordance with some embodiments of the present invention.

Referring now to FIG. 9, a logic flow diagram 900 is provided that illustrates a method performed by communication system 800 in coordinating an operation of the multiple mobile devices 802-805 in accordance with an embodiment of the present invention. Logic flow diagram 800 begins (902) when multiple mobile devices 802-804 under the control of a same user activate (904) in communication system 800. It is assumed herein for the purpose of illustrating the principles of the present invention, that mobile device 805 is under the control of a different user than mobile devices 802-804. For example, the mobile devices 802-804 may power up in communication system 800 or the mobile devices may roam into a coverage area of a WAN 830, 840, 850 of communication system 800. As part of the process of activating, each mobile device 802-804 of the user registers (906) with its respective Group Application Server 852, 862 and 842 respectively. In registering the mobile devices, the Group Application Server 862 is informed whether any of the mobile devices is currently serviced by a different Group Application Server; for example, mobile devices 803 and 804 may be Open Mobile Alliance (OMA) mobile devices that each are serviced by a respective OMA Push-to-Talk over Cellular (PoC) server 842, 852 associated with their respective WANs 840, 850. As noted above, Group Application Server 862 then maintains, in its at least one memory device 404, an identifier associated with each mobile device 802-804 participating in the call and further, in association with the identifier of each such mobile device, a location of the mobile device and/or a Group Application Server serving the mobile device. Thus, Group Application Server 862 knows where to route media intended for each mobile device 802-804 participating in the group call.

Subsequent to the registration of the multiple mobile devices 802-804, a group call is initiated that includes the user and, correspondingly, mobile devices 802-804. For example, the group call may be initiated by a mobile device 805 associated with a different user than the user of mobile devices 802-804. In response to the initiation of the group call, each of mobile devices 802-804 joins (908) the call at Group Application Server 862. For example, Group Application Server 862 may set up the group call with mobile device 803 using ISSI and via the OMA PoC server 842 serving mobile device 803, and Group Application Server 862 may set up the group call with mobile device 804 using OMA NNI and via the OMA PoC server 852 serving mobile device 804.

At some point either prior to or after the initiation of the group call, a first mobile device of the user, such as mobile device 802 (and/or audio accessory 806 with respect to mobile device 802) determines (910), based on signals generated by one or more sensor devices of the mobile device and/or one or more sensor devices of the audio accessory, that it is the 'active device' among the multiple mobile devices 802-804 associated with that user. For example, mobile device 802 may detect, via a motion sensor 262 of the mobile device, a motion of the mobile device that indicates that the mobile device has been selected by the user to input communications intended for conveyance to Group Application Server 862 and to receive communications from the Group Application Server, for example, when the mobile device is lifted up or when a position of the mobile device otherwise changes in a way that might indicate that the user has selected the mobile device for inputting or receiving communications. By way of another example, mobile device 802 may detect, via a touch sensor 264 of the mobile device, that the user is holding the mobile device in his/her hand, indicating that the user has selected the mobile device for inputting or receiving communications. By way of yet another example, mobile device 802 may detect, via a proximity sensor 266 of the mobile device, that the mobile device is proximate to the body of the user, or to a face of the user, indicating that the user has selected the mobile device for inputting or receiving communications. In still other examples, mobile device 802 may determine that it is the 'active device' because the user has touched or depressed a PTT key of the user interface 210, 310 of the mobile device or the audio accessory connected to the mobile device, because the mobile device has received audio input from the user via audio input circuitry 230, 308 of the mobile device or the audio accessory, or because the user has removed the mobile device or the audio accessory from a belt, carry case, or shoulder strap of the user, as detected by mechanical connector 250 or 314.

In response to determining, by the mobile device 802, that it is the active device, the mobile device conveys (912), via wireless link 812, an active device indication to Group Application Server 862 indicating that it is the active device among the multiple mobile devices 802-804 of the user. In one embodiment of the present invention, the active device indication may be a control message. For example, the active device indication may be a new or existing Media Burst Control Protocol (MBCP) message, for example, an RTP message or an RTCP message, that is modified to include an indicator that the mobile device sourcing the active device indication is an active device of the user associated with the mobile device.

In response to receiving the active device indication, Group Application Server 862 identifies (914), by reference to the user's profile in user profile database 406, a second one or more mobile devices (that is, 'non-active devices') of the multiple mobile devices 802-804 associated with the user, that is, mobile devices 803 and 804. Group Application Server 862 then conveys (916), to each Group Application Server 842, 852 serving one or more of the multiple mobile devices 802-804 under the control of the user and via a corresponding ISSI NNI or OMA NNI, an indication that mobile device 802 is the active device. For example, Group Application Server 862 may forward the active device indication received from mobile device 802, may generate and forward its own active device indication in response to receiving the active device indication from mobile device 802, or may convey an indication that mobile devices 803 and 804 are non-active devices.

In one embodiment of the present invention, in response to receiving the active device indication (or, in some embodiments of the present invention, a non-active device indication) and to identifying the non-active devices 803, 804 served by the Group Application Server 842, 852, each Group Application Server 842, 852 serving a non-active device (as well as Group Application Server 862 in the event that it is serving a non-active device in addition to active device 802) blocks (918) a conveyance, by the Group Application Server, of media steams of the group call to the non-active devices. Logic flow diagram 900 then may end (926).

In another embodiment of the present invention, in response to receiving the active device indication (or, in some embodiments, a non-active device indication) and identifying the non-active devices associated with the user, each Group Application Server 842, 852 serving a non-active device (as well as Group Application Server 862 in the event that it is serving a non-active device in addition to active device 802) conveys (920) a behavior modification message to each non-active device 803, 804 served by the Group Application Server, which behavior modification message instructs the non-active device to modify its behavior in way appropriate for a non-active device. For example, the behavior modification message may be a Media Burst Control Protocol (MBCP) message that is modified to include a behavior modification instruction and that is encapsulated in ISSI NNI or OMA NNI signaling. In one embodiment of the present invention, the behavior modification instruction may comprise metadata instructing the non-active device 803, 804 to undertake a particular behavior, for example, mute a speaker of its audio output circuitry 220, lower a brightness of its display screen 214, or provide one or more of an audio (for example, a beep), a visual (for example, a status bar notification or a blinking LED on a panel) or a haptic (for example, a vibration) notification about non-active device status.

In response to receiving the behavior modification instruction, each non-active device 803, 804 modifies (922) its behavior as indicated by the message. However, in another embodiment of the present invention, the behavior modification message conveyed to each non-active device 803, 804 may comprise an instruction to modify the mobile device's behavior in way appropriate for a non-active device without listing behaviors to be modified. In this later instance, the non-active device then may modify its behavior in accordance with instructions maintained in the non-active device behavior modification module 208 of the at least one memory device 204 of the non-active device. Logic flow diagram 900 then ends (926).

In yet another embodiment of the present invention, at some point in time during the group call, a non-active mobile device of the user's multiple mobile devices 802-804, such as mobile device 803, may determine (924), based on signals generated by one of more of the sensor devices 260, that it is now the 'active device' among the multiple mobile devices 802-804 associated with that user. Logic flow diagram 900 then returns to step 912, wherein the new active device 803 conveys, via a corresponding wireless link 813, an OMA PoC server 842 serving the mobile device, and a corresponding ISSI or OMA NNI interface, an active device indication to Group Application Server 862 indicating that it is the active device among the multiple mobile devices 802-804 of the user.

It may be noted that Group Application Server 862 shall perform these actions to mobile devices served by itself according to the teachings of FIG. 5 as well as mobile devices served by other Group Application Servers 842 and 852 at the same time.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for coordinating an operation of a plurality of mobile devices of a same user in a group call, the method comprising:
    joining the plurality of mobile devices of the same user to the group call without action from the user using sensor analytics;
    receiving an indication that a first mobile device of the plurality of mobile devices is an active device;
    in response to receiving the indication that the first mobile device is an active device, determining that a second one or more mobile devices of the plurality of mobile devices are mobile devices of the user and are non-active devices; and
    in response to determining that the second one or more mobile devices are mobile devices of the user and are non-active devices, performing one or more of:
        modifying subsequent communications with the second one or more mobile devices as part of the group call; and
        conveying a behavior modification message to the second one or more mobile devices.

2. The method of claim 1, wherein conveying a behavior modification message to the second one or more mobile devices comprises conveying an instruction to perform: mute a speaker, lower a brightness of a display screen, or provide one or more of an audio, a visual, or a haptic notification.

3. A method for coordinating an operation of a plurality of mobile devices of a user in a group call, the method comprising:
    joining, by the plurality of mobile devices of the user, the group call;
    determining, by a first mobile device of the plurality of mobile devices, that it is an active device using sensor analytics without action by the user; and
    in response to determining that the first mobile device is an active device, conveying, by the first mobile device to a second one or more mobile devices of the plurality of mobile devices and via one or more short range wireless links between the first mobile device and the second one or more mobile devices, a behavior modification message associated with a second one or more mobile devices.

4. The method of claim 3, wherein conveying the behavior modification message comprises:
    conveying an instruction to the second one or more mobile devices to one or more of mute a speaker, lower a brightness of a display screen, or to provide one or more of an audio, a visual, or a haptic notification.

5. The method of claim 3, wherein the step of determining that it is an active device using sensor analytics without action by the user comprises determining using one or more of a motion sensor, a touch sensor, and a proximity sensor of the first mobile device.

6. An apparatus for coordinating an operation of a plurality of mobile devices of a same user in a group call, the apparatus comprising:
    a Group Application Server comprising: a processor; and at least one memory device that is configured to store a set of instructions that, when executed by the processor, perform the following functions:
    join the plurality of mobile devices of the same user to the group call; receive an indication that a first mobile device of the plurality of mobile devices is an active device,
    wherein the first mobile device comprises one or more sensor devices and determines that it is the active device based on signals generated by one or more sensor devices without action from the same user;
    in response to receiving the indication that the first mobile device is an active device, determine that a second one or more mobile devices of the plurality of mobile devices are mobile devices of the user and are non-active devices; and
    in response to determining that the second one or more mobile devices are mobile devices of the user and are non-active devices, perform one or more of: modify subsequent communications with the second one or more mobile devices as part of the group call; and
    convey a behavior modification message to the second one or more mobile devices.

7. The apparatus of claim 6, wherein the set of instructions, when executed by the processor, perform one or more of modifying subsequent communications and conveying a behavior modification message by performing at least the modifying of subsequent communications with the second one or more mobile devices, and wherein modifying subsequent communications comprises:
    blocking a flow of media of the group call to the second one or more mobile devices.

8. The apparatus of claim 6, wherein the set of instructions, when executed by the processor, perform the conveying of a behavior modification message to the second one or more mobile devices by:
    conveying an instruction to one or more of mute a speaker, lower a brightness of a display screen, or to provide one or more of an audio, a visual, or a haptic notification.

9. The apparatus of claim 6, wherein the one or more sensor devices comprise one or more of a motion sensor, a touch sensor, and a proximity sensor of the first mobile device.

10. The apparatus of claim 6, wherein conveying a behavior modification message to the second one or more mobile devices:
    determining another Group Application Server serving the second one or more mobile devices; and
    conveying an instruction to the another Group Application Server to modify the behavior of the second one or more mobile devices.

11. An apparatus for coordinating an operation of a plurality of mobile devices of a same user in a group call, the apparatus comprising:
a first mobile device comprising:
  a processor;
  one or more sensor devices;
  an at least one memory device that is configured to store a set of instructions that, when executed by the processor, perform the following functions:
    join the first mobile device to the group call without action from the same user;
    determine that the first mobile device is an active device based on signals generated by the one or more sensor devices without action from the same user; and
    in response to determining that the first mobile device is an active device, convey, to a second one or more mobile devices of the plurality of mobile devices and via one or more short range wireless links between the first mobile device and the second one or more mobile devices, a behavior modification message associated with a second one or more mobile devices, wherein the first mobile device and the second one or more mobile devices are included in the plurality of mobile devices of the same user.

12. The apparatus of claim 11, the set of instructions, when executed by the processor, perform the conveying of the behavior modification message by:
conveying an instruction to the second one or more mobile devices to one or more of mute a speaker, lower a brightness of a display screen, or to provide one or more of an audio, visual, or haptic notification.

13. The apparatus of claim 11, further comprising:
the second one or more mobile devices, wherein the second one or more mobile devices are configured to:
  in response to receiving the instruction to modify a behavior, convey, to a Group Application Server, a communication modification message requesting that the Group Application Server modify its communications with the second one or more mobile devices without input from the same user.

14. The apparatus of claim 11, wherein the one or more sensor devices comprise one or more of a motion sensor, a touch sensor, and a proximity sensor of the first mobile device.

15. The apparatus of claim 11, further comprising:
an audio accessory coupled to the first mobile device, wherein the audio accessory comprises one or more sensor devices and wherein the set of instructions, when executed by the processor, perform the determining that the first mobile device is the active device based on signals generated by the one or more sensor devices of the audio accessory.

* * * * *